United States Patent
Liu et al.

(10) Patent No.: US 12,542,962 B2
(45) Date of Patent: Feb. 3, 2026

(54) DRIVING COMPONENT, CAMERA ASSEMBLY AND ELECTRONIC DEVICE

(71) Applicant: BEIJING XIAOMI MOBILE SOFTWARE CO., LTD., Beijing (CN)

(72) Inventors: Jiangwei Liu, Beijing (CN); Hui Wang, Beijing (CN); Zongbao Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 578 days.

(21) Appl. No.: 17/955,059

(22) Filed: Sep. 28, 2022

(65) Prior Publication Data

US 2023/0421879 A1 Dec. 28, 2023

(30) Foreign Application Priority Data

Jun. 23, 2022 (CN) ......................... 202210725359.X

(51) Int. Cl.
*H04N 23/57* (2023.01)
*G02B 7/10* (2021.01)
(Continued)

(52) U.S. Cl.
CPC .............. *H04N 23/57* (2023.01); *G02B 7/10* (2013.01); *H04N 23/51* (2023.01); *H04N 23/687* (2023.01); *H02K 41/0354* (2013.01)

(58) Field of Classification Search
CPC .... H04N 23/57; H04N 23/51; H02K 41/0354; H02N 2/028; H10N 35/00
See application file for complete search history.

(56) References Cited

U.S. PATENT DOCUMENTS

2007/0114855 A1* 5/2007 Chamura ............... H10N 35/00
                                                    310/26
2015/0346587 A1* 12/2015 Lim ....................... G03B 17/02
                                                    348/373
(Continued)

FOREIGN PATENT DOCUMENTS

CN       110445972 A   * 11/2019   ........... H04N 5/2251
CN       110650274 A     1/2020
(Continued)

OTHER PUBLICATIONS

Grunwald, Artur, and Abdul-Ghani Olabi. "Design of a Magnetostrictive (MS) Actuator." Sensors and Actuators A—Physical, vol. 144, No. 1, May 1, 2008, pp. 161-175, https://doi.org/10.1016/j.sna.2007.12.034. Accessed Sep. 19, 2023. (Year: 2008).*

(Continued)

*Primary Examiner* — George G. King
*Assistant Examiner* — Natasha Nigam
(74) *Attorney, Agent, or Firm* — Arch & Lake LLP; Hao Tan; Shen Wang

(57) ABSTRACT

A driving component includes a fixing frame, a carrier unit and a magnetostrictive member. The carrier unit is configured to carry a component to be driven, and the carrier unit is connected to the fixing frame and configured to move relative to the fixing frame. The magnetostrictive member is connected with the fixing frame and the carrier unit and configured to control a position of the carrier unit relative to the fixing frame through expansion and contraction of the magnetostrictive member.

14 Claims, 3 Drawing Sheets

(51) Int. Cl.
*H04N 23/51* (2023.01)
*H04N 23/68* (2023.01)
*H02K 41/035* (2006.01)

(56) References Cited

U.S. PATENT DOCUMENTS

| | | |
|---|---|---|
| 2019/0346740 A1 | 11/2019 | Suh et al. |
| 2023/0086451 A1* | 3/2023 | Chen .................. G03B 30/00 |
| | | 348/208.2 |
| 2023/0156329 A1* | 5/2023 | Jang ..................... G03B 5/00 |
| | | 396/55 |

FOREIGN PATENT DOCUMENTS

| | | |
|---|---|---|
| CN | 110784650 A | 2/2020 |
| JP | 2011191304 A | 9/2011 |
| JP | 2012226205 A | 11/2012 |
| JP | 2014164266 A | 9/2014 |
| JP | 2017107191 A | 6/2017 |
| JP | 2018535844 A | 12/2018 |
| KR | 20210056029 A | 5/2021 |
| KR | 20220038622 A | 3/2022 |
| WO | 2015156135 A1 | 10/2015 |

OTHER PUBLICATIONS

Extended European Search Report of EP Application No. 22198348.9 dated Jun. 13, 2023, (7p).
The KROA issued in KR Application No. 10-2022-0123428 dated Oct. 24, 2024 with English translation, (11p).
First Office Action of Japanese Application No. 2022-155047 with English translation, (10p).

* cited by examiner

DRIVING COMPONENT, CAMERA ASSEMBLY AND ELECTRONIC DEVICE

CROSS-REFERENCE TO RELATED APPLICATION

The present application claims the benefit of priority to Chinese Application No. 202210725359.X, filed on Jun. 23, 2022, the entire content of which is incorporated herein by reference for all purposes.

BACKGROUND

A camera of an electronic device generally has a focusing function and an anti-shake function. A component to realize these functions includes a motor configured to drive a lens to move. The driving of the motor enables the camera of the electronic device to simultaneously have the focusing function and the anti-shake function, so that scenes at different object distances can be clearly presented on a screen of the electronic device easily. The anti-shake function can compensate for the image offset caused by hands tremble of a consumer when taking photos. Therefore, it is possible for the consumer to obtain a high-quality film or image on the electronic device anytime and anywhere by simply pressing a shutter.

SUMMARY

The present disclosure relates to a field of electromagnetic driving, and more particularly, to a driving component, a camera assembly and an electronic device.

A first aspect of the present disclosure provides a driving component, including: a fixing frame; a carrier unit configured to carry a component to be driven, the carrier unit being connected to the fixing frame and configured to move relative to the fixing frame; and a magnetostrictive member connected with the fixing frame and the carrier unit and configured to control a position of the carrier unit relative to the fixing frame through expansion and contraction of the magnetostrictive member.

A second aspect of the present disclosure further provides a camera assembly including a camera and a driving component. The driving component includes: a fixing frame; a carrier unit configured to carry a component to be driven, the carrier unit being connected to the fixing frame and configured to move relative to the fixing frame; and a magnetostrictive member connected with the fixing frame and the carrier unit and configured to control a position of the carrier unit relative to the fixing frame through expansion and contraction of the magnetostrictive member. The camera is fixed to the carrier unit, and the driving component is configured to perform a zoom function and/or an anti-shake function.

A third aspect of the present disclosure further provides an electronic device including a camera assembly. The camera assembly includes a camera and a driving component. The driving component includes: a fixing frame; a carrier unit configured to carry a component to be driven, the carrier unit being connected to the fixing frame and configured to move relative to the fixing frame; and a magnetostrictive member connected with the fixing frame and the carrier unit and configured to control a position of the carrier unit relative to the fixing frame through expansion and contraction of the magnetostrictive member. The camera is fixed to the carrier unit, and the driving component is configured to perform a zoom function and/or an anti-shake function.

Additional aspects and advantages of the present disclosure will be given in part in the following description, become apparent in part from the following description, or be learned from the practice of the present disclosure.

BRIEF DESCRIPTION OF THE DRAWINGS

Accompanying drawings herein are incorporated into the specification and constitute a part of the specification, show embodiments consistent with the present disclosure, and are used to explain the principles of the present disclosure together with the specification.

DETAILED DESCRIPTION

Embodiments of the present disclosure are described in detail below, and examples of the embodiments are shown in accompanying drawings. The following embodiments described with reference to the accompanying drawings are exemplary and are intended to explain the present disclosure, and cannot be understood as limitations to the present disclosure.

In order to realize a focusing function and an anti-shake function of a camera, a motor is used, and a common driving principle of the motor is an electromagnetic driving, which provides a single mode for realizing the focusing function and the anti-shake function.

Examples of the present disclosure provide a driving component, which is configured to drive a camera to realize focusing and anti-shake (i.e., image stabilization) functions.

Figure 1:
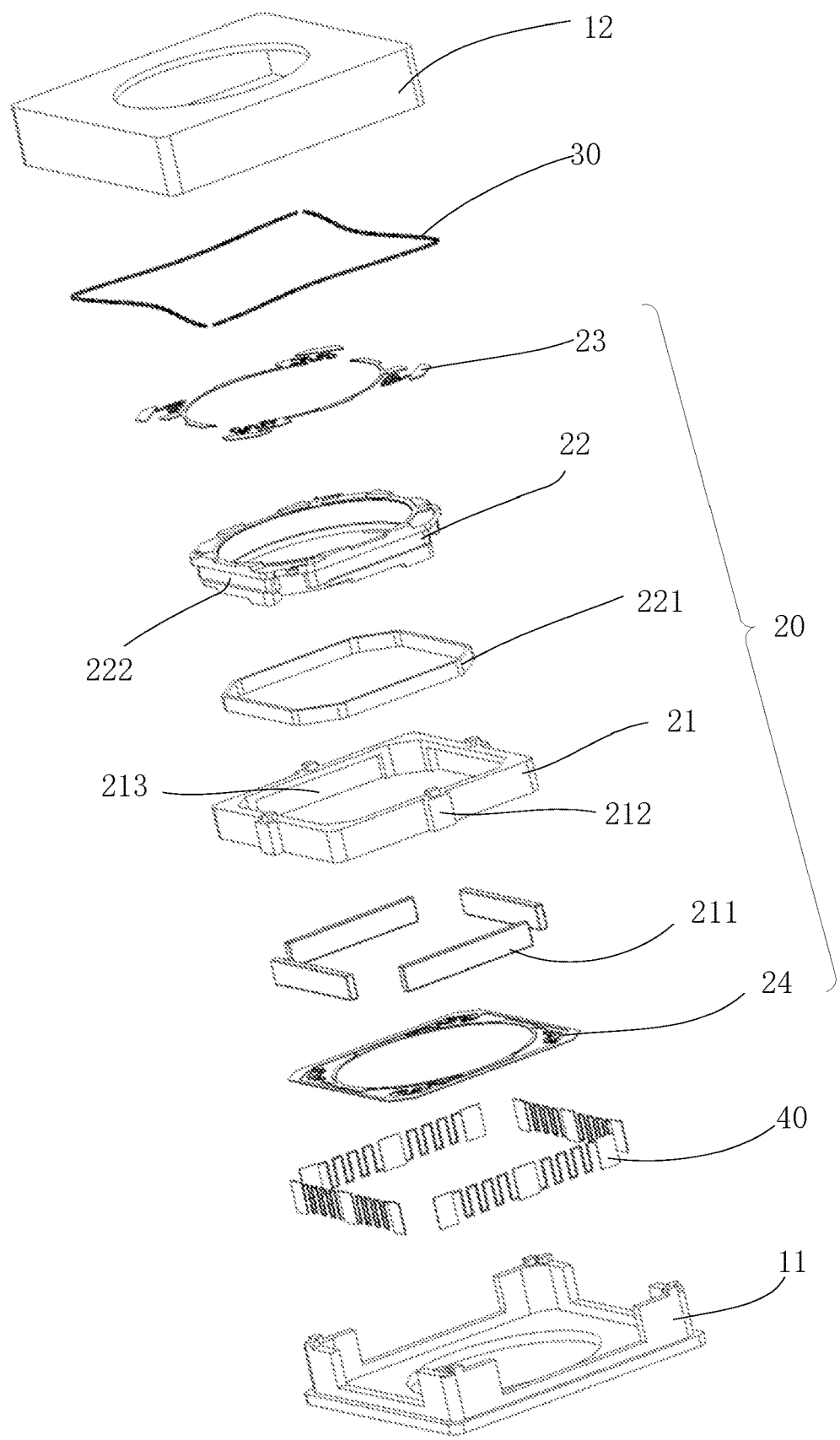
FIG. 1 is an exploded schematic view of a driving component according to an example of the present disclosure.
Figure 2:
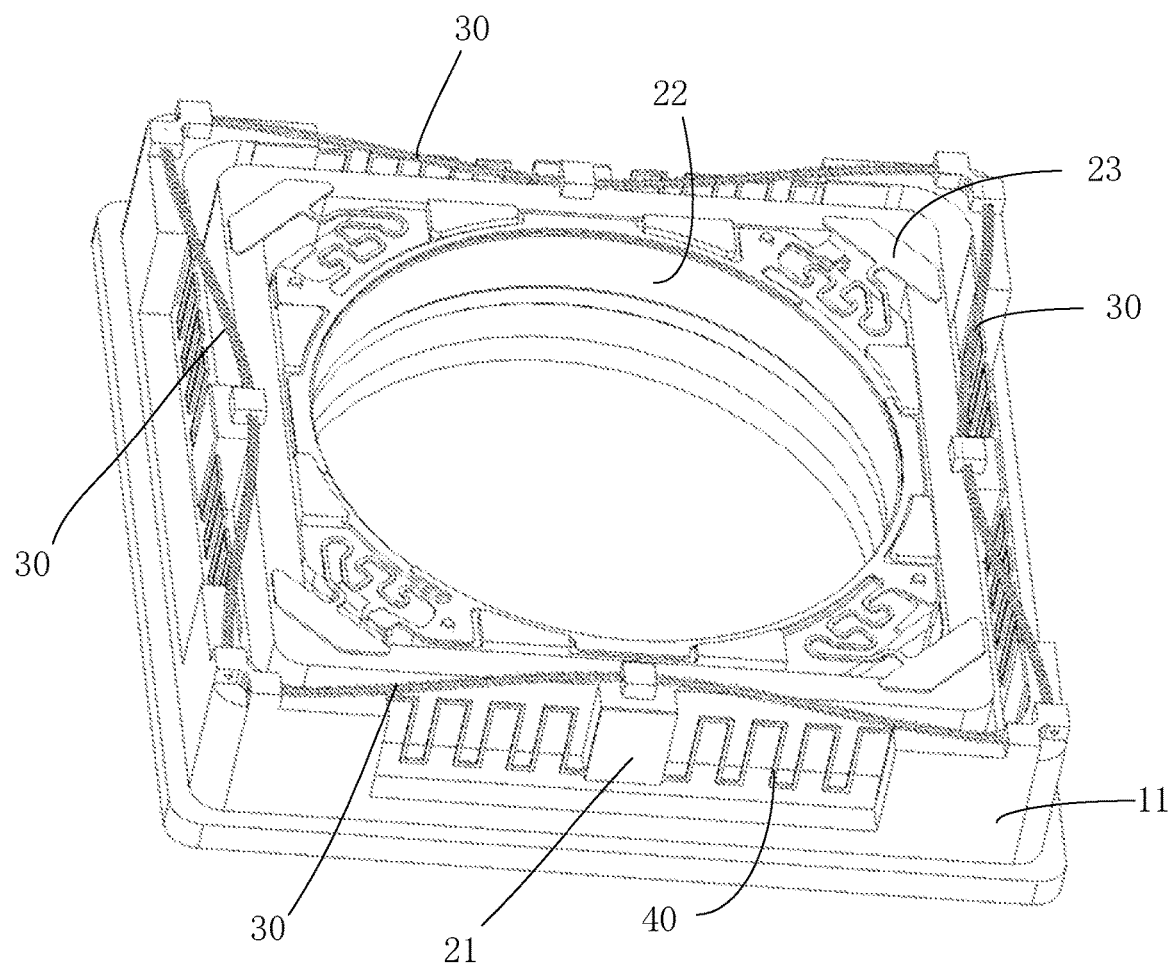
FIG. 2 is a perspective view of a driving component according to an example of the present disclosure, in which an upper cover is hidden.
Figure 3:
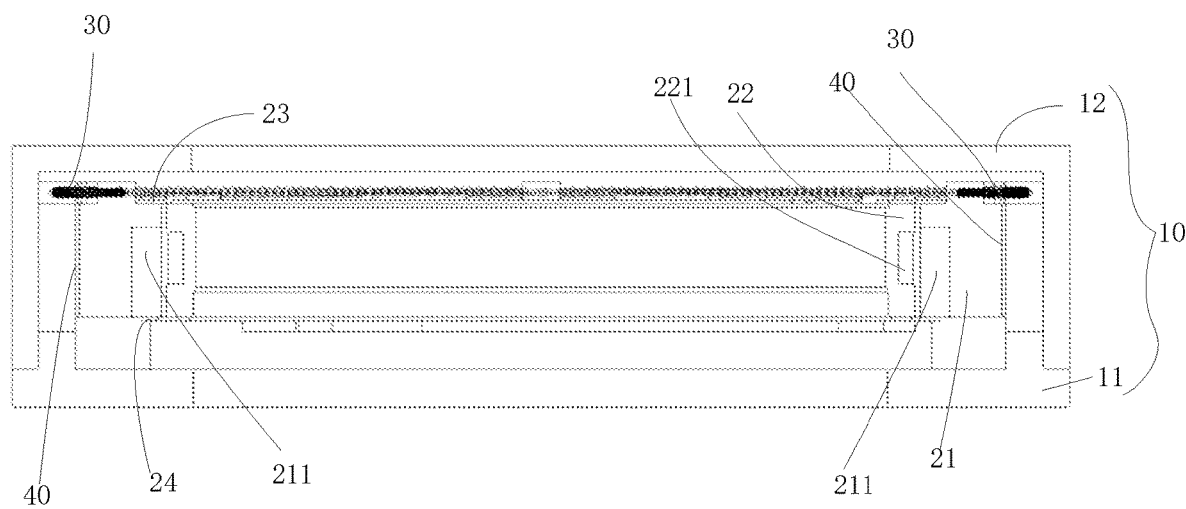
FIG. 3 is a sectional schematic view of a driving component according to an example of the present disclosure.

Referring to FIGS. 1-3, in some examples, the driving component includes a fixing frame 10, a carrier unit 20, and a magnetostrictive member 30. The carrier unit 20 is configured to carry a component to be driven, and the component to be driven may be a camera. The carrier unit 20 is connected to the fixing frame 10 and may move relative to the fixing frame 10. The anti-shake function may be realized by controlling a relative position of the carrier unit 20 and the fixing frame 10. The magnetostrictive member 30 is connected with the fixing frame 10 and the carrier unit 20, and may control a position of the carrier unit 20 relative to the fixing frame 10 through its own expansion and contraction.

The magnetostrictive member 30 itself may expand or contract by means of electric control, thus driving the carrier unit 20 to move relative to the fixing frame 10, so as to realize the anti-shake function. The driving of the carrier unit 20 may be realized by the magnetostrictive member 30 in a magnetostrictive mode, or by a magnetostrictive driving and an electromagnetic driving (a driving realized by the interaction of a magnet and a coil) together. That is, the carrier unit 20 may be subjected to two different types of driving forces to complete the corresponding functions. Thus, the examples of the present disclosure provide a new driving mode, and are no longer limited to the mode in which the electromagnetic driving is provided alone, so that those skilled in the art may have more design options.

If the driving of the carrier unit 20 is realized by the magnetostrictive member 30 in the magnetostrictive mode, the position of the carrier unit 20 may be controlled without the magnet, thus avoiding the interference of the magnet on the surrounding magnetic devices. Moreover, since the magnetostrictive member is small in size and occupies a small space, it is more beneficial to the overall structure stacking. In addition, when driving a camera with a same size and a same weight, the driving component of the present disclosure has a smaller structural size than a driving component in the related art, thus reducing the occupation of space.

If the component to be driven is the camera, the magnetostrictive member 30 may drive the carrier unit 20 to realize the anti-shake function of the camera. The anti-shake function is realized by the expansion and contraction of the magnetostrictive member 30, so that the magnet does not need to be provided. Hence, the overall height of the driving component will be reduced, so as to reduce a shoulder height of a module in which the driving component is used, thus reducing a protrusion height of an electronic device to which the module is applied.

Figure 4:
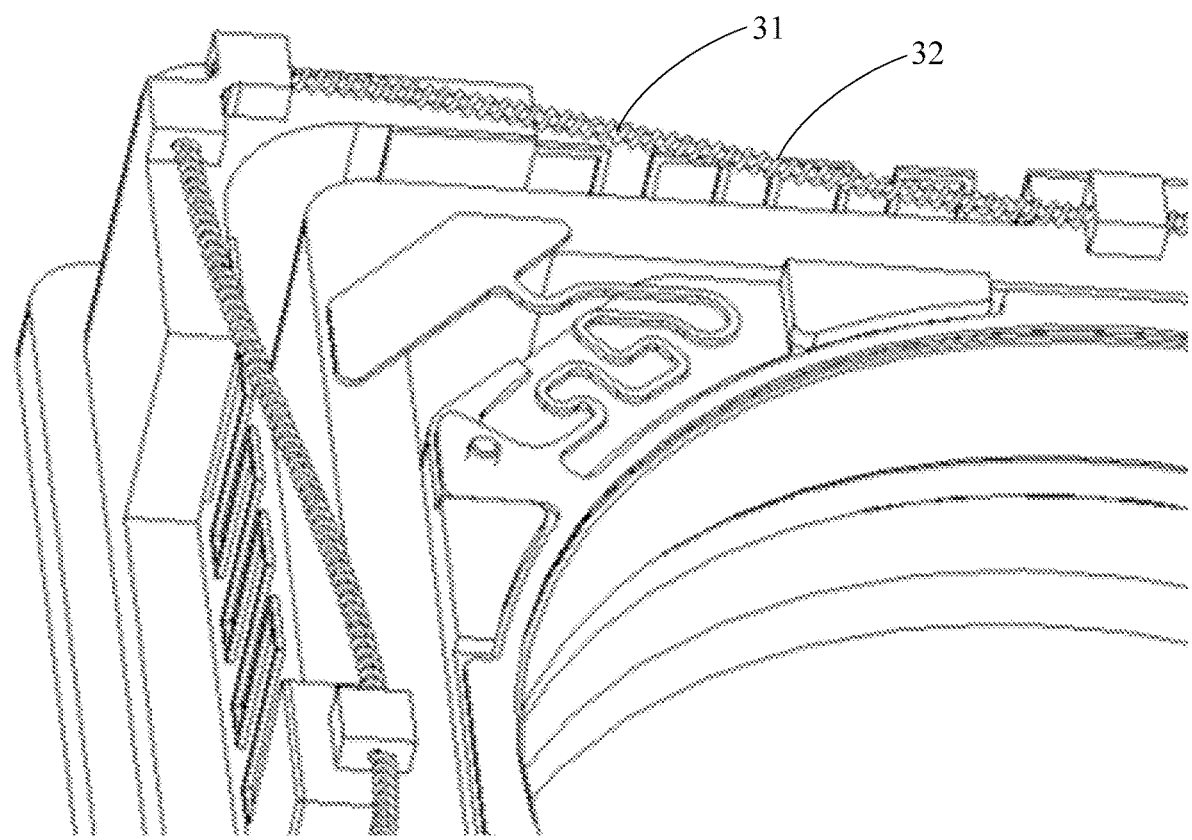
FIG. 4 is a partial enlarged view of the driving component in FIG. 2.

In some examples, as shown in FIG. 4, the magnetostrictive member 30 includes a magnetostrictive body 31 and a first coil 32 wound around the magnetostrictive body 31, and an expanded or contracted state of the magnetostrictive body 31 is adjusted by controlling a current of the first coil 32. The magnetostrictive body 31 may be made of a giant magnetostrictive material (GMM). A length and a volume of the giant magnetostrictive material will change greatly at room temperature due to a change of its magnetization state, i.e., a magnetostrictive material with a great magnetostrictive coefficient is called the giant magnetostrictive material. The magnetostrictive material may achieve a high-efficiency conversion between mechanical energy and electrical energy, and has a high energy density, a fast response speed, a good reliability and a simple driving mode.

A change of the current applied into the first coil 32 may change a magnetic field around the magnetostrictive body 31, thus changing the magnetization state of the magnetostrictive body 31, so as to make the magnetostrictive body 31 expand or contract. Specifically, when a current is applied to the first coil 32, a magnetic field along a axial direction is generated based on the principle of electromagnetic induction, so that the magnetostrictive body 31 undergoes an expansion-contraction transformation under the action of the magnetic field, thus realizing an energy conversion of the electric energy, the magnetic energy and the mechanical energy.

For example, the magnetostrictive body 31 is a rod-shaped body, the rod-shaped body may be a round rod or an elliptical rod, and the first coil 32 is uniformly wound on the magnetostrictive body 31.

In some examples, a plurality of magnetostrictive members 30 are provided, and the plurality of magnetostrictive members 30 are around the carrier unit 20. Thus, the plurality of magnetostrictive members 30 may simultaneously drive the carrier unit 20, so that the carrier unit moves more smoothly, thus improving the performance of the anti-shake function.

Specifically, the plurality of magnetostrictive members 30 drive the carrier unit 20 at different positions of the carrier unit 20. According to requirements of the anti-shake function, currents applied to different magnetostrictive members 30 may be different or the same.

In some examples, the fixing frame 10 includes a base 11 and an upper cover 12 connected to the base 11. An accommodating cavity is defined between the base 11 and the upper cover 12, and the carrier unit 20 is in the accommodating cavity. The base 11 and the upper cover 12 may be snapped or connected by a screw, so as to provide a stable mounting fundament.

Specifically, the base 11 has a circular hole in its center, and includes an L-shaped protruding structure at each of its four corners. The upper cover 12 has a circular hole in its center, the upper cover 12 includes a flat plate and four side plates extending from four edges of the flat plate towards a side (for example, towards the base 11), the circular hole of the upper cover 12 is in the flat plate, and the protruding structure of the base 11 is closely fitted with an inner wall of the side plate.

In some examples, referring to FIG. 2, two ends of each magnetostrictive member are connected to the fixing frame 10, a middle portion of each magnetostrictive member 30 is connected to the carrier unit 20, and connecting lines between two end points of the magnetostrictive member 30 and a connecting point of the magnetostrictive member 30 and the carrier unit 20 enclose a triangle. That is to say, the two end points of the magnetostrictive member and the connecting point of the magnetostrictive member 30 and the carrier unit 20 are not on a same straight line. Therefore, when the magnetostrictive member 30 expands or contracts, lengths of two sides (formed by the magnetostrictive member 30) of the enclosed triangle also change. The two ends of the magnetostrictive member 30 are fixed to the fixing frame 10, so that positions of the two ends do not change, and hence a position of the connecting point of the magnetostrictive member 30 and the carrier unit 20 changes, so as to drive the carrier unit 20 to move.

Specifically, the two ends of each magnetostrictive member 30 are connected to the protruding structures of the base 11.

In some examples, the driving component further includes a first elastic member and the first elastic member 40 is connected with the fixing frame 10 and the carrier unit 20, so that the carrier unit 20 is elastically moveable relative to the fixing frame 10. By providing the first elastic member 40, the carrier unit 20 is subjected to an elastic constraining force of the first elastic member 40 when the magnetostrictive member 30 drives the carrier unit 20, thus making the movement of the carrier unit 20 more stable.

The first elastic member 40 is adopted, replacing a suspension wire in the related art, so as to realize a restoring force of an anti-shake movement, thus reducing the material cost and the assembling and manufacturing cost. The first elastic member 40 is fixed to the fixing frame and the carrier unit 20 with a sufficient contact area, thus greatly improving the adhesive property and reliability of the connection.

Specifically, the first elastic member 40 may be made of a metal material and may adopt a metal wire of a tortuous shape.

Further, a plurality of first elastic members 40 are provided, and the plurality of first elastic members 40 are around the carrier unit 20. Two ends of the first elastic member 40 are connected to the fixing frame 10, and a middle portion of the first elastic member 40 is connected to the carrier unit 20.

Shapes and specifications of the plurality of first elastic members 40 may be the same or different. The plurality of first elastic members 40 are connected to the carrier unit 20 at different positions, so as to make the carrier unit 20 more stable. The magnetostrictive member 30 needs to overcome the elastic force of the first elastic member 40 when driving the carrier unit 20.

In some examples, the carrier unit 20 includes a first carrier 21 and a second carrier 22. The first carrier 21 is connected to the fixing frame 10 and movable relative to the fixing frame 10, and the magnetostrictive member 30 is connected with the fixing frame 10 and the first carrier 21. The second carrier 22 is configured to carry the component to be driven. The second carrier 22 is connected to the first carrier 21 and movable relative to the first carrier 21. When the component to be driven is the camera, the second carrier 22 moves relative to the first carrier 21, so as to realize a zoom control of the camera. A moving direction of the second carrier 22 relative to the first carrier 21 is an up-down direction in FIG. 3.

Specifically, the first carrier 21 may be connected to the fixing frame 10 through the first elastic member 40. The first carrier 21 may have a shape of a square frame. A connecting portion 212 connected to the first elastic member 40 is at a middle portion of each of four rims of the first carrier 21, as shown in FIG. 1. The first elastic member 40 passes through the connecting portion 212, and the two ends of the first elastic member 40 are connected to the protruding structures of the base 11.

In some examples, one of the first carrier 21 and the second carrier 22 has a magnet 211 and the other one of the first carrier 21 and the second carrier 22 has a second coil 221. A position of the second carrier 22 relative to the first carrier 21 (or vice versa) is adjusted by controlling a current of the second coil 221. That is to say, in this example, the first carrier 21 and the second carrier 22 adopt the driving mode of magnets and coils, in cooperation with the driving mode of the magnetostrictive member 30, so that the driving component utilizes both the driving mode of the expansion and contraction of the magnetostrictive member 30 itself and the driving mode of magnets and coils, and the two driving modes are used together. In some examples, the magnetostrictive driving mode (i.e. the driving mode of the magnetostrictive member 30) may also be used alone, and those skilled in the art may select a specific driving mode according to functional requirements of the driving component.

When the component to be driven is the camera, the driving component can realize the focusing function and the anti-shake function for the camera. Specifically, the whole carrier unit 20 is driven by the magnetostrictive member 30 to move, so as to realize the anti-shake function, and the second carrier 22 is moved relative to the first carrier 21 (or vice versa) through the interaction of the magnet 211 and the second coil 221, so as to realize the focusing function.

For those skilled in the art, the first carrier 21 and the second carrier 22 may also be driven by adopting the magnetostrictive driving mode, so that the driving component is completely free of the magnet, thus reducing the interference of the magnet to a greatest extent.

For example, referring to FIG. 1 and FIG. 3, the first carrier 21 has a magnet accommodating groove 213 in its inner side, the magnet 211 is fixed in the magnet accommodating groove 213, the second carrier 22 has a coil accommodating groove 222 in its outer periphery, and the second coil 221 is wound in the coil accommodating groove 222, so that both the magnet 211 and the second coil 221 are stably mounted. The second coil 221 moves synchronously with the second carrier 22, and the magnet 211 moves synchronously with the first carrier 21.

In some examples, the first carrier 21 and the second carrier 22 both have a shape of a frame, and the second carrier 22 is inside the first carrier 21, so that a thickness of the driving component is not increased, which is conducive to reducing the size and the space occupation.

Further, the carrier unit 20 further includes a second elastic member 23, and the second elastic member 23 is connected with the first carrier 21 and the second carrier 22, so that the second carrier 22 is elastically moveable relative to the first carrier 21 (or vice versa). The second elastic member 23 may be a metal spring, and can ensure that the movement of the second carrier 22 relative to the first carrier 21 (or vice versa) is more stable.

Further, the carrier unit 20 further includes a third elastic member 24, and the third elastic member 24 is connected with the first carrier 21 and the second carrier 22, so that the second carrier 22 is elastically moveable relative to the first carrier 21 (or vice versa). The function of the third elastic member 24 is similar to the function of the second elastic member 23, and the second elastic member 23 and the third elastic member 24 both can ensure that the moving process of the second carrier 22 relative to the first carrier 21 (or vice versa) is more stable. Moreover, the effect is better by providing the third elastic member 24 and the second elastic member 23 at the same time.

The second elastic member 23 is at upper ends of the first carrier 21 and the second carrier 22, and the third elastic member 24 is lower ends of the first carrier 21 and the second carrier 22, so as to realize a mutual connection between the upper ends of the first carrier 21 and the second carrier 22 and a mutual connection between the lower ends of the first carrier 21 and the second carrier 22, thus improving the overall stability of the driving component and improving the focusing accuracy of the camera.

Examples of the present disclosure further provide a camera assembly, and the camera assembly includes a camera and a driving component according to any one of the above examples. The camera is fixed to the carrier unit 20, and a zoom function and/or an anti-shake function are performed by the driving component. The camera assembly can be applied to various electronic devices with a photographing function, such as a mobile phone, a computer, an unmanned aerial vehicle, etc.

Examples of the present disclosure further provide an electronic device, and the electronic device includes a camera assembly according to any one of the above examples. The electronic device may be a mobile phone, a computer, an unmanned aerial vehicle, etc.

In the description of the present disclosure, it shall be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation and position as then described or as shown in the drawings under discussion. These relative terms are for convenience of description and do not indicate or imply that the device or element referred to must have a particular orientation, or be constructed and operated in a particular orientation. Thus, these terms shall not be construed as limitation on the present disclosure.

In addition, terms "first" and "second" are used for descriptive purposes and cannot be understood as indicating or implying relative importance or implicitly indicating the number of indicated technical features. Thus, the features defined by "first" and "second" may include at least one of the features explicitly or implicitly. In the description of the present disclosure, "a plurality of" means at least two such as two or three, unless otherwise expressly and specifically defined.

In the present disclosure, unless otherwise expressly defined, terms such as "mounting," "interconnection," "connection," "fixing" shall be understood broadly, and may be, for example, fixed connections, detachable connections, or integral connections; may also be mechanical or electrical connections or intercommunication; may also be direct connections or indirect connections via intervening media; may also be inner communications or interactions of two elements. For those skilled in the art, the specific meaning of the above terms in the present disclosure can be understood according to the specific situations.

In the present disclosure, unless otherwise expressly defined and specified, a structure in which a first feature is "on" or "below" a second feature may include an embodiment in which the first feature is in direct contact with the second feature, or may further include an embodiment in which the first feature and the second feature are in indirect contact through intermediate media. Furthermore, a first feature "on," "above," or "on top of" a second feature may include an embodiment in which the first feature is right or obliquely "on," "above," or "on top of" the second feature, or just means that the first feature is at a height higher than that of the second feature, while a first feature "below," "under," or "on bottom of" a second feature may include an embodiment in which the first feature is right or obliquely "below," "under," or "on bottom of" the second feature, or just means that the first feature is at a height lower than that of the second feature.

In the description of the present disclosure, terms such as "an embodiment," "some embodiments," "an example," "a specific example," or "some examples," means that a particular feature, structure, material, or characteristic described in connection with the embodiment or example is included in at least one embodiment or example of the present disclosure. Thus, the appearances of these terms in various places throughout this specification are not necessarily referring to the same embodiment or example of the present disclosure. Furthermore, the particular features, structures, materials, or characteristics described may be combined in any suitable manner in one or more embodiments or examples. In addition, without contradiction, those skilled in the art may combine and unite different embodiments or examples or features of the different embodiments or examples described in this specification.

Although the embodiments of the present disclosure have been shown and described above, it can be understood that the above embodiments are exemplary and shall not be understood as limitation to the present disclosure, and changes, modifications, alternatives and variations can be made in the above embodiments within the scope of the present disclosure by those skilled in the art.

What is claimed is:

1. A driving component, comprising:
   a fixing frame;
   a carrier unit connected to the fixing frame, wherein the carrier unit is configured to carry a component to be driven, and move relative to the fixing frame; and
   a magnetostrictive member connected with the fixing frame and the carrier unit, wherein the magnetostrictive member is configured to control a position of the carrier unit relative to the fixing frame through expansion and contraction of the magnetostrictive member,
   wherein the magnetostrictive member comprises a magnetostrictive body and a first coil wound around the magnetostrictive body, and an expanded or contracted state of the magnetostrictive body is adjusted by controlling a current of the first coil,
   wherein the carrier unit comprises a first carrier and a second carrier;
   the first carrier is connected to the fixing frame and movable relative to the fixing frame, and the magnetostrictive member is connected with the fixing frame and the first carrier; and
   the second carrier is configured to carry the component to be driven, and the second carrier is connected with the first carrier and movable relative to the first carrier,
   wherein a plurality of first elastic members are provided, the plurality of first elastic members are disposed around the carrier unit, two ends of the first elastic member are connected to the fixing frame, and a middle portion of the first elastic member is connected to the carrier unit,
   wherein the carrier unit further comprises a second elastic member, and the second elastic member is connected with the first carrier and the second carrier, and the second carrier is elastically moveable relative to the first carrier,
   wherein the carrier unit further comprises a third elastic member, and the third elastic member is connected the first carrier and the second carrier, and the second carrier is elastically moveable relative to the first carrier;
   the second elastic member is disposed at upper ends of the first carrier and the second carrier, and the third elastic member is disposed at lower ends of the first carrier and the second carrier;
   wherein the fixing frame comprises a base, wherein the base comprises a protruding structure at each corner, and wherein the magnetostrictive member connection with the fixing frame is by connecting two ends of the magnetostrictive member to the protruding structures.

2. The driving component according to claim 1, wherein a plurality of magnetostrictive members are provided, and the plurality of the magnetostrictive members are disposed around the carrier unit.

3. The driving component according to claim 2, the two ends of each magnetostrictive member are connected to the protruding structure at each corner, a middle portion of each magnetostrictive member is connected to the carrier unit.

4. The driving component according to claim 1, wherein the first elastic member is connected with the fixing frame and the carrier unit, and the carrier unit is elastically moveable relative to the fixing frame.

5. The driving component according to claim 1, wherein one of the first carrier and the second carrier has a magnet and the other one of the first carrier and the second carrier has a second coil, and a position of the second carrier relative to the first carrier is adjusted by controlling a current of the second coil.

6. The driving component according to claim 5, wherein the first carrier and the second carrier are in a shape of a frame, and the second carrier is disposed inside the first carrier.

7. The driving component according to claim 1, wherein the fixing frame comprises an upper cover connected to the base, an accommodating cavity is defined between the base and the upper cover, and the carrier unit is in the accommodating cavity.

8. A camera assembly, comprising a driving component, the driving component comprising:
   a fixing frame;
   a carrier unit connected to the fixing frame, wherein the carrier unit is configured to carry a component to be driven, and move relative to the fixing frame; and a magnetostrictive member connected with the fixing frame and the carrier unit, wherein the magnetostrictive member is configured to control a position of the carrier unit relative to the fixing frame through expansion and contraction of the magnetostrictive member, wherein the driving component is configured to perform a zoom function or an anti-shake function, wherein the magnetostrictive member comprises a magnetostrictive body and a first coil wound around the magnetostrictive body, and an expanded or contracted state of the magnetostrictive body is adjusted by controlling a current of the first coil, wherein the carrier unit comprises a first carrier and a second carrier;

the first carrier is connected to the fixing frame and movable relative to the fixing frame, and the magnetostrictive member is connected with the fixing frame and the first carrier; and the second carrier is configured to carry the component to be driven, and the second carrier is connected with the first carrier and movable relative to the first carrier, wherein a plurality of first elastic members are provided, the plurality of first elastic members are disposed around the carrier unit, two ends of the first elastic member are connected to the fixing frame, and a middle portion of the first elastic member is connected to the carrier unit, wherein the carrier unit further comprises a second elastic member, and the second elastic member is connected with the first carrier and the second carrier, and the second carrier is elastically moveable relative to the first carrier, wherein the carrier unit further comprises a third elastic member, and the third elastic member is connected the first carrier and the second carrier, and the second carrier is elastically moveable relative to the first carrier;

the second elastic member is disposed at upper ends of the first carrier and the second carrier, and the third elastic member is disposed at lower ends of the first carrier and the second carrier;

wherein the fixing frame comprises a base, wherein the base comprises a protruding structure at each corner, and wherein the magnetostrictive member connection with the fixing frame is by connecting two ends of the magnetostrictive member to the protruding structures.

9. The camera assembly according to claim 8, further comprising a plurality of magnetostrictive members disposed around the carrier unit.

10. The camera assembly according to claim 9, the two ends of each magnetostrictive member are connected to the protruding structure at each corner, a middle portion of each magnetostrictive member is connected to the carrier unit, and connecting lines between two end points of the magnetostrictive member and a connecting point of the magnetostrictive member and the carrier unit enclose a triangle.

11. The camera assembly according to claim 8, further comprising a first elastic member, wherein the first elastic member is connected with the fixing frame and the carrier unit, and the carrier unit is elastically moveable relative to the fixing frame.

12. The camera assembly according to claim 8, wherein one of the first carrier and the second carrier has a magnet and the other one of the first carrier and the second carrier has a second coil, and a position of the second carrier relative to the first carrier is adjusted by controlling a current of the second coil.

13. An electronic device, comprising a camera assembly, the camera assembly comprising a driving component, the driving component comprising:

a fixing frame;

a carrier unit connected to the fixing frame, wherein the carrier unit is configured to carry a component to be driven, and move relative to the fixing frame; and a magnetostrictive member connected with the fixing frame and the carrier unit, wherein the magnetostrictive member is configured to control a position of the carrier unit relative to the fixing frame through expansion and contraction of the magnetostrictive member, wherein the driving component is configured to perform a zoom function or an anti-shake function, wherein the magnetostrictive member comprises a magnetostrictive body and a first coil wound around the magnetostrictive body, and an expanded or contracted state of the magnetostrictive body is adjusted by controlling a current of the first coil, wherein the carrier unit comprises a first carrier and a second carrier;

the first carrier is connected to the fixing frame and movable relative to the fixing frame, and the magnetostrictive member is connected with the fixing frame and the first carrier; and the second carrier is configured to carry the component to be driven, and the second carrier is connected with the first carrier and movable relative to the first carrier, wherein a plurality of first elastic members are provided, the plurality of first elastic members are disposed around the carrier unit, two ends of the first elastic member are connected to the fixing frame, and a middle portion of the first elastic member is connected to the carrier unit, wherein the carrier unit further comprises a second elastic member, and the second elastic member is connected with the first carrier and the second carrier, and the second carrier is elastically moveable relative to the first carrier, wherein the carrier unit further comprises a third elastic member, and the third elastic member is connected the first carrier and the second carrier, and the second carrier is elastically moveable relative to the first carrier;

the second elastic member is disposed at upper ends of the first carrier and the second carrier, and the third elastic member is disposed at lower ends of the first carrier and the second carrier; and wherein the fixing frame comprises a base, wherein the base comprises a protruding structure at each corner, and wherein the magnetostrictive member connection with the fixing frame is by connecting two ends of the magnetostrictive member to the protruding structures.

14. The driving component according to claim 1, wherein the first carrier is in a shape of a square frame, a connecting portion connected to the first elastic member is arranged at a middle portion of at least one of four rims of the first carrier, and the first elastic member passes through the connecting portion.

* * * * *